United States Patent
Eichhorst et al.

(10) Patent No.: US 6,767,047 B2
(45) Date of Patent: Jul. 27, 2004

(54) CONVERTIBLE ROOF LATCH

(75) Inventors: Stefan Eichhorst, West Bloomfield, MI (US); Gary J. Forgue, Northville, MI (US); David W. Brooks, Plymouth, MI (US)

(73) Assignee: ASC Incorporated, Southgate, MI (US)

( * ) Notice: Subject to any disclaimer, the term of this patent is extended or adjusted under 35 U.S.C. 154(b) by 0 days.

(21) Appl. No.: 10/629,410

(22) Filed: Jul. 29, 2003

(65) Prior Publication Data

US 2004/0032147 A1 Feb. 19, 2004

Related U.S. Application Data

(60) Provisional application No. 60/403,689, filed on Aug. 15, 2002.

(51) Int. Cl.[7] ................ B60J 7/19; B60J 7/14
(52) U.S. Cl. ............. 296/128; 296/108; 296/121; 292/DIG. 5
(58) Field of Search .............. 296/108, 120.1, 296/121, 124, 128; 292/216, DIG. 5

(56) References Cited

U.S. PATENT DOCUMENTS

| | | |
|---|---|---|
| 2,935,350 A | 5/1960 | Bestrom |
| 4,415,189 A | 11/1983 | Kastelic, Jr. |
| 4,441,345 A | 4/1984 | Guarr |
| 4,466,644 A | 8/1984 | Wooten et al. |
| 4,523,785 A | 6/1985 | Draper et al. |
| 4,529,243 A | 7/1985 | Kaltz et al. |
| 4,537,440 A | 8/1985 | Brockway et al. |
| 4,540,215 A | 9/1985 | Swearingen |
| 4,600,233 A | 7/1986 | Boydston |
| 4,687,247 A | 8/1987 | Muscat |
| 4,712,828 A | 12/1987 | Albrecht |
| 4,723,812 A | 2/1988 | Masuda et al. |
| 4,783,113 A | 11/1988 | Padlo |

(List continued on next page.)

FOREIGN PATENT DOCUMENTS

| | | | |
|---|---|---|---|
| DE | 44 15 969 A1 | 11/1995 | |
| EP | 1 072 455 A2 | 1/2001 | |
| EP | 1 072 456 A2 | 1/2001 | |
| EP | 1 092 580 A1 | 4/2001 | |
| GB | 165609 | * 7/1921 | ................. 296/128 |
| WO | WO 02/064391 A1 | 8/2002 | |

OTHER PUBLICATIONS

4–Pages of Photos of 2000 Model Year, Mercedes SLK Convertible Top Latch Mechanism.

*Primary Examiner*—Dennis H. Pedder
(74) *Attorney, Agent, or Firm*—Harness, Dickey & Pierce, P.L.C.

(57) ABSTRACT

A convertible roof latch operable to retain a convertible roof apparatus in a retracted position. The convertible roof latch is lockingly engaged and disengaged in response to actuation of a tonneau cover. The convertible roof latch is positionable in an unlocked position where a top stack mechanism is free to move relative to the locking mechanism and a locked position where the top stack mechanism is coupled with the locking mechanism when the tonneau cover is in the closed position to prevent relative movement of the top stack mechanism and the locking mechanism.

30 Claims, 10 Drawing Sheets

U.S. PATENT DOCUMENTS

| | | |
|---|---|---|
| 4,799,729 A | 1/1989 | Muscat |
| 4,801,173 A | 1/1989 | Trenkler |
| 4,815,775 A | 3/1989 | Mertin et al. |
| 4,819,983 A | 4/1989 | Alexander et al. |
| 4,830,425 A | 5/1989 | Muscat |
| 4,898,410 A | 2/1990 | Brin |
| 4,917,415 A | 4/1990 | Wurl |
| 5,035,463 A | 7/1991 | Kato et al. |
| 5,042,869 A | 8/1991 | Brin |
| 5,046,767 A | 9/1991 | Muscat |
| 5,052,740 A | 10/1991 | Bauer et al. |
| RE33,790 E | 1/1992 | Huber |
| 5,085,483 A | 2/1992 | Alexander |
| 5,154,479 A | 10/1992 | Sautter, Jr. |
| 5,186,516 A | 2/1993 | Alexander et al. |
| 5,269,586 A | 12/1993 | Hahn et al. |
| 5,284,378 A | 2/1994 | Sautter, Jr. |
| 5,301,987 A | 4/1994 | Tokarz et al. |
| 5,322,336 A | 6/1994 | Isler |
| 5,338,085 A | 8/1994 | Guckel et al. |
| 5,413,390 A | 5/1995 | Filippi |
| 5,429,400 A | 7/1995 | Kawaguchi et al. |
| 5,435,615 A | 7/1995 | Schmitz |
| 5,451,849 A * | 9/1995 | Porter et al. ................ 318/466 |
| 5,490,709 A | 2/1996 | Rahn |
| 5,582,454 A | 12/1996 | Grover |
| 5,595,407 A | 1/1997 | ter Horst et al. |
| 5,620,226 A | 4/1997 | Sautter, Jr. |
| 5,624,149 A | 4/1997 | Tokarz |
| 5,645,309 A | 7/1997 | Graf |
| 5,678,881 A | 10/1997 | Tokarz |
| 5,722,704 A | 3/1998 | Chaput et al. |
| 5,743,587 A | 4/1998 | Alexander et al. |
| 5,755,467 A | 5/1998 | Dilluvio et al. |
| 5,769,483 A | 6/1998 | Danzl et al. |
| 5,772,275 A | 6/1998 | Tokarz |
| 5,785,375 A | 7/1998 | Alexander et al. |
| 5,820,206 A | 10/1998 | Smith |
| 5,833,300 A | 11/1998 | Russke |
| 5,839,778 A | 11/1998 | Schaible et al. |
| 5,904,394 A | 5/1999 | Dilluvio et al. |
| 5,921,608 A | 7/1999 | Schmitt et al. |
| 5,944,375 A | 8/1999 | Schenk et al. |
| 5,954,382 A | 9/1999 | Combs |
| 5,967,593 A | 10/1999 | Schuler et al. |
| 5,979,970 A | 11/1999 | Rothe et al. |
| 6,019,417 A | 2/2000 | Haberl |
| 6,027,162 A | 2/2000 | Smith |
| 6,033,008 A | 3/2000 | Mattila |
| 6,033,009 A | 3/2000 | Ritter et al. |
| 6,039,383 A | 3/2000 | Jambor et al. |
| 6,042,174 A | 3/2000 | Durrani |
| 6,048,021 A | 4/2000 | Sautter, Jr. |
| 6,053,560 A | 4/2000 | Rothe |
| 6,062,625 A | 5/2000 | Elelnrieder et al. |
| 6,062,637 A | 5/2000 | Hoffmann |
| 6,086,136 A | 7/2000 | Jambor et al. |
| 6,095,590 A | 8/2000 | Matsuda et al. |
| 6,102,456 A | 8/2000 | Boersma |
| 6,131,988 A | 10/2000 | Queveau et al. |
| 6,145,915 A | 11/2000 | Queveau et al. |
| 6,155,614 A | 12/2000 | Lange |
| 6,158,786 A | 12/2000 | Droste et al. |
| 6,168,224 B1 | 1/2001 | Henn et al. |
| 6,182,527 B1 | 2/2001 | Sander |
| 6,213,534 B1 | 4/2001 | Mac Farland |
| 6,217,104 B1 | 4/2001 | Neubrand |
| 6,227,604 B1 | 5/2001 | Grace |
| 6,254,165 B1 | 7/2001 | Neubrand |
| 6,257,648 B1 | 7/2001 | Schenk |
| 6,267,433 B1 * | 7/2001 | Bayer et al. ................ 296/121 |
| 6,270,144 B1 | 8/2001 | Schenk |
| 6,290,281 B1 | 9/2001 | Durrani et al. |
| 6,293,605 B2 | 9/2001 | Neubrand |
| 6,309,005 B1 | 10/2001 | Priest et al. |
| 6,315,349 B1 | 11/2001 | Kinnanen |
| 6,318,792 B1 | 11/2001 | Neubrand et al. |
| 6,318,793 B1 | 11/2001 | Rapin et al. |
| 6,331,029 B1 | 12/2001 | Schenk |
| 6,336,673 B1 | 1/2002 | Rothe et al. |
| 6,347,828 B1 | 2/2002 | Rapin et al. |
| 6,349,990 B1 | 2/2002 | Park |
| 6,361,086 B1 | 3/2002 | Robbins et al. |
| 6,364,396 B1 | 4/2002 | Hayashi et al. |
| 6,382,701 B1 | 5/2002 | Langguth et al. |
| 6,390,530 B1 | 5/2002 | Maass |
| 6,390,531 B1 | 5/2002 | Schutt |
| 6,390,532 B1 | 5/2002 | Mac Farland |
| 6,409,247 B1 | 6/2002 | Maass |
| 6,419,294 B2 | 7/2002 | Neubrand |
| 6,419,308 B1 | 7/2002 | Corder et al. |
| 6,595,574 B2 | 7/2003 | Shaw et al. |
| 6,659,534 B2 * | 12/2003 | Willard ................ 296/108 |
| 2001/0005090 A1 | 6/2001 | Haberl et al. |
| 2002/0005089 A1 | 1/2002 | Nagata et al. |
| 2002/0014782 A1 | 2/2002 | Neubrand |
| 2003/0034668 A1 | 2/2003 | Quindt |

* cited by examiner

US 6,767,047 B2

CONVERTIBLE ROOF LATCH

CROSS-REFERENCE TO RELATED APPLICATIONS

This application claims the benefit of U.S. Provisional Application No. 60/403,689, filed on Aug. 15, 2002. The disclosure of the above application is incorporated herein by reference.

BACKGROUND AND SUMMARY OF THE INVENTION

This invention relates generally to automotive roof systems and, more particularly, relates to a latch for retaining a convertible roof apparatus.

Rigid hard-top convertible roofs have been used on a variety of automotive vehicles. Some of these conventional convertible hard-top roofs are stored in a generally vertical orientation and some are stored in a predominantly horizontal orientation. Furthermore, some of these conventional hard-top roofs fold in a clamshelling manner while others are collapsible in an overlapping manner. Examples of traditional hard-top convertible roofs are disclosed in the following patents: U.S. Pat. No. 6,347,828 entitled "Actuation Mechanism for a Two Piece Retractable Hard-Top Roof for an Automobile" which issued to Rapin et al. on Feb. 19, 2002; U.S. Pat. No. 6,318,793 entitled "Two Piece Retractable Hard-Top Roof for an Automobile" which issued to Rapin et al. on Nov. 20, 2001; U.S. Pat. No. 5,979,970 entitled "Roof Assembly for a Convertible Vehicle" which issued to Rothe et al. on Nov. 9, 1999; U.S. Pat. No. 5,785,375 entitled "Retractable Hard-Top for an Automotive Vehicle" which issued to Alexander et al. on Jul. 28, 1998; U.S. Pat. No. 5,769,483 entitled "Convertible Motor Vehicle Roof" which issued to Danzi et al. on Jun. 23, 1998; U.S. Pat. No. 5,743,587 entitled "Apparatus for Use in an Automotive Vehicle having a Convertible Roof System" which issued to Alexander et al. on Apr. 28, 1998; and EPO Patent Publication No. 1 092 580 A1 which was published on Apr. 18, 2001. The U.S. patents are incorporated by reference herein.

Traditionally, most rigid hard-top convertible roofs are unrestrained in their collapsed position such that the roof panel(s) and/or top stack mechanism is generally free to vibrate or otherwise produce unwanted noise and/or harshness.

In accordance with the present invention, a convertible roof latch is provided. In another aspect of the present invention, the convertible roof latch is operable to retain the convertible roof apparatus in a collapsed position. A further aspect of the present invention provides that the convertible roof latch is lockingly engaged and disengaged in response to actuation of a tonneau cover. In yet another aspect of the present invention, the convertible roof latch is lockingly engaged and disengaged in response to a cable drive connection with the tonneau cover.

The apparatus of the present invention is advantageous over conventional convertible roof systems in that the present invention is anticipated to provide superior resistance to noise, vibration, and harshness caused by the unrestrained movement of the convertible roof apparatus while in a collapsed position.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment is merely exemplary in nature and is in no way intended to limit the invention, its application, or uses.

Figure 1:
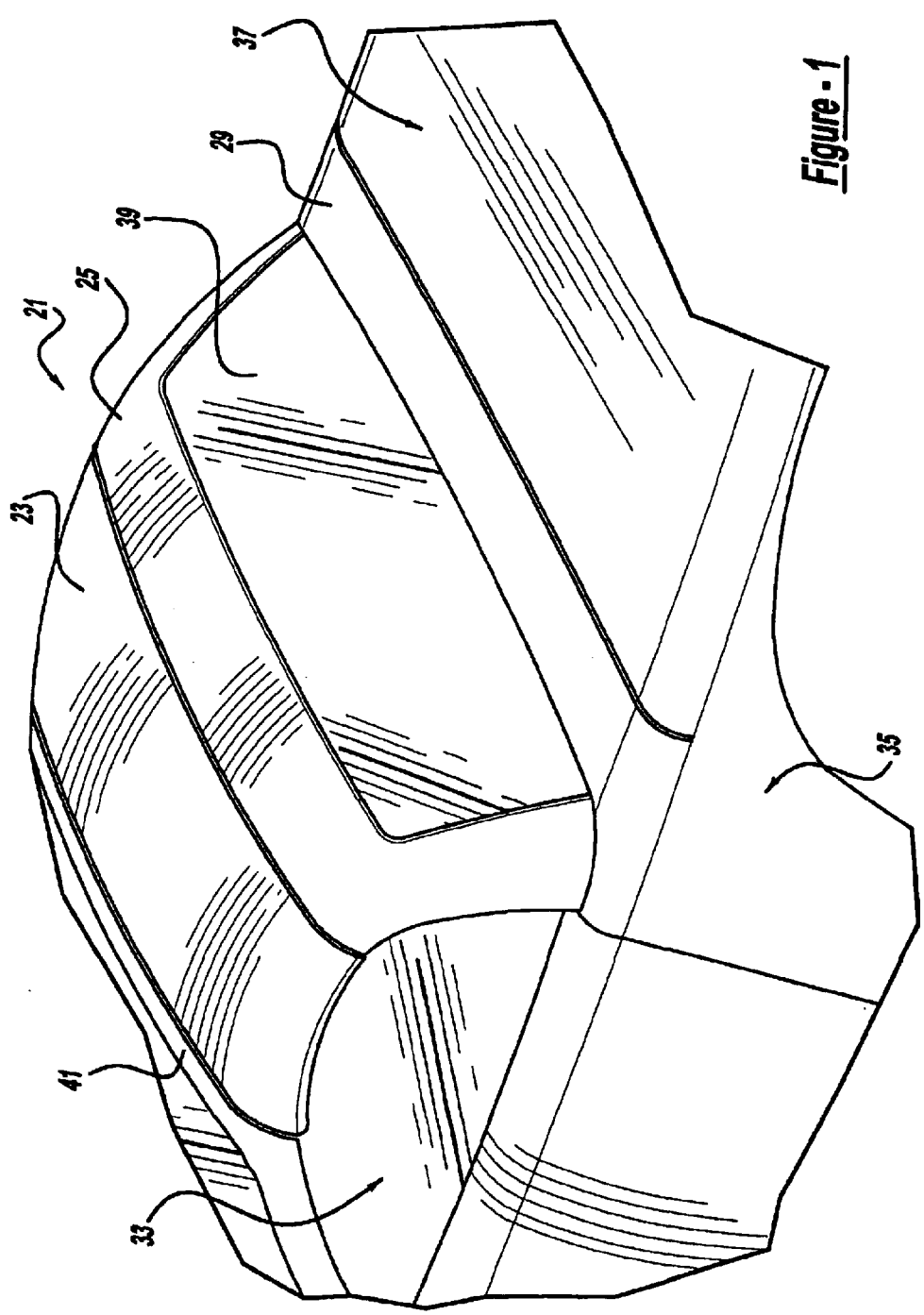
FIG. 1 is a fragmentary, perspective view, as observed from the rear left corner of the vehicle, showing the preferred embodiment of a hard-top convertible roof apparatus of the present invention disposed in a fully closed and raised position.
Figure 2:
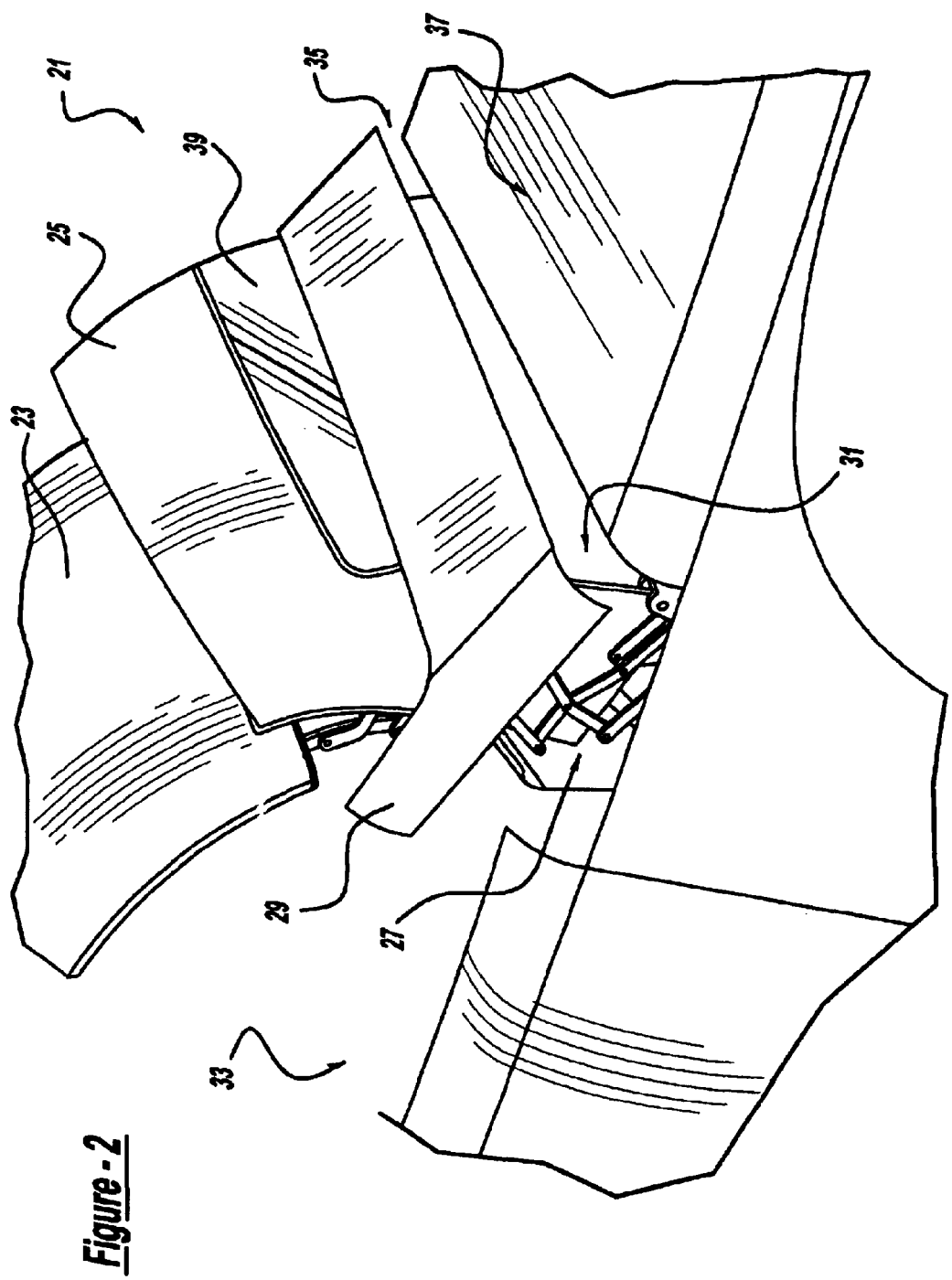
FIG. 2 is a fragmentary and perspective view, like that of FIG. 1, showing the preferred embodiment apparatus disposed in a partially retracted position.
Figure 3:
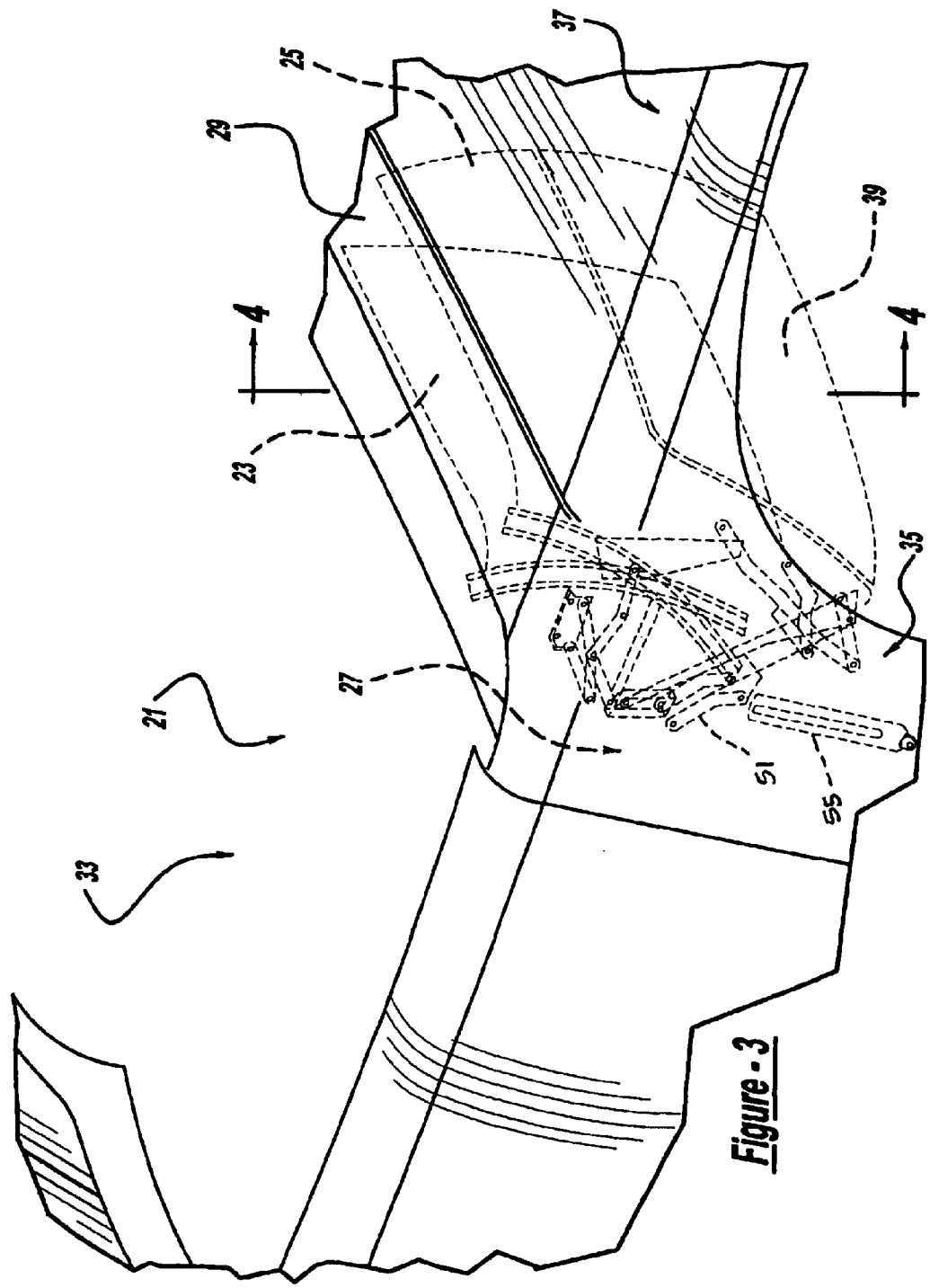
FIG. 3 is a fragmentary and perspective view, like that of FIG. 1, showing the preferred embodiment apparatus disposed in a fully open and retracted position.
Figure 4:
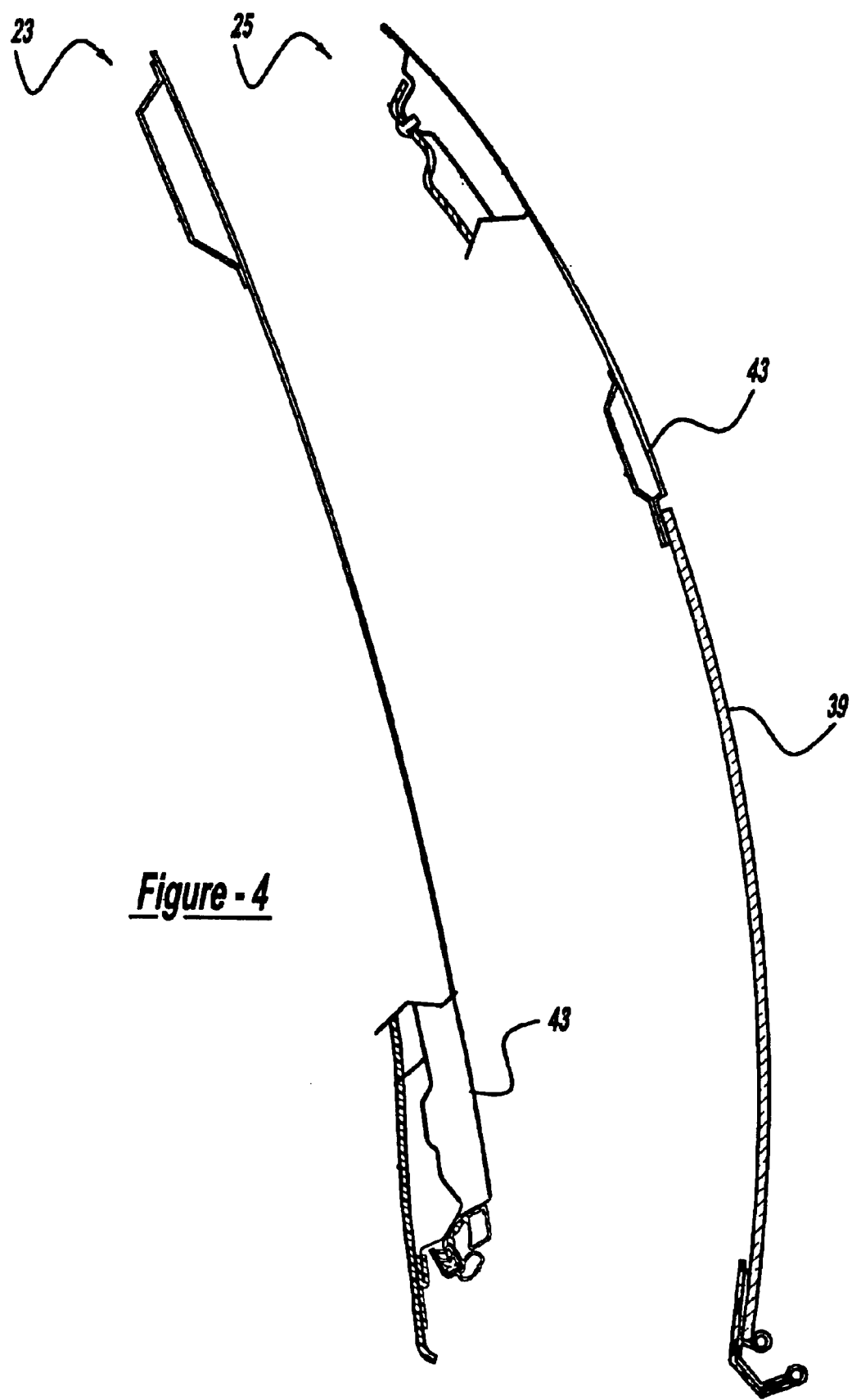
FIG. 4 is a centerline cross sectional view showing the preferred embodiment apparatus, disposed in the fully retracted position.
Figure 5:
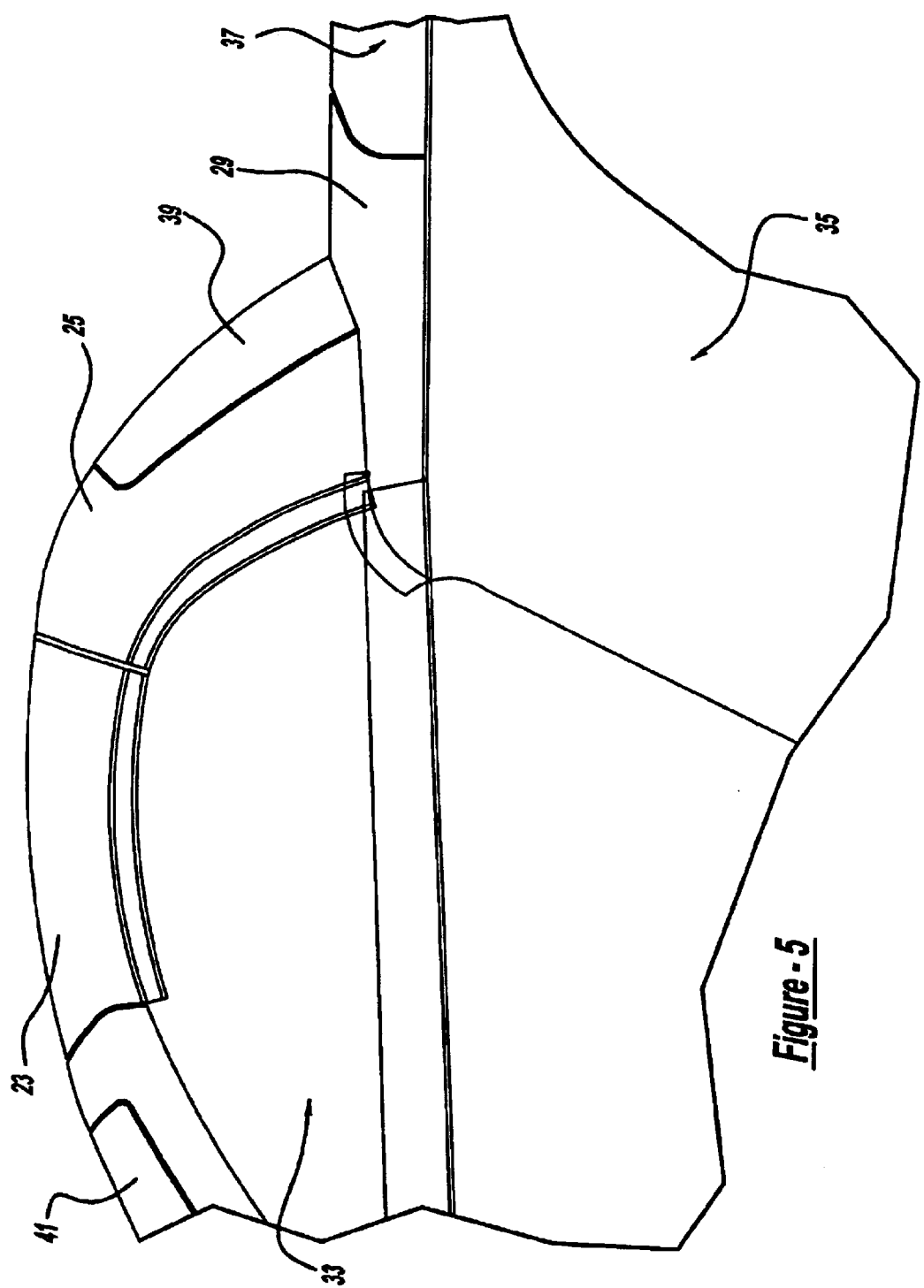
FIG. 5 is a side diagrammatic view showing the preferred embodiment apparatus, disposed in the fully retracted position.
Figure 6:
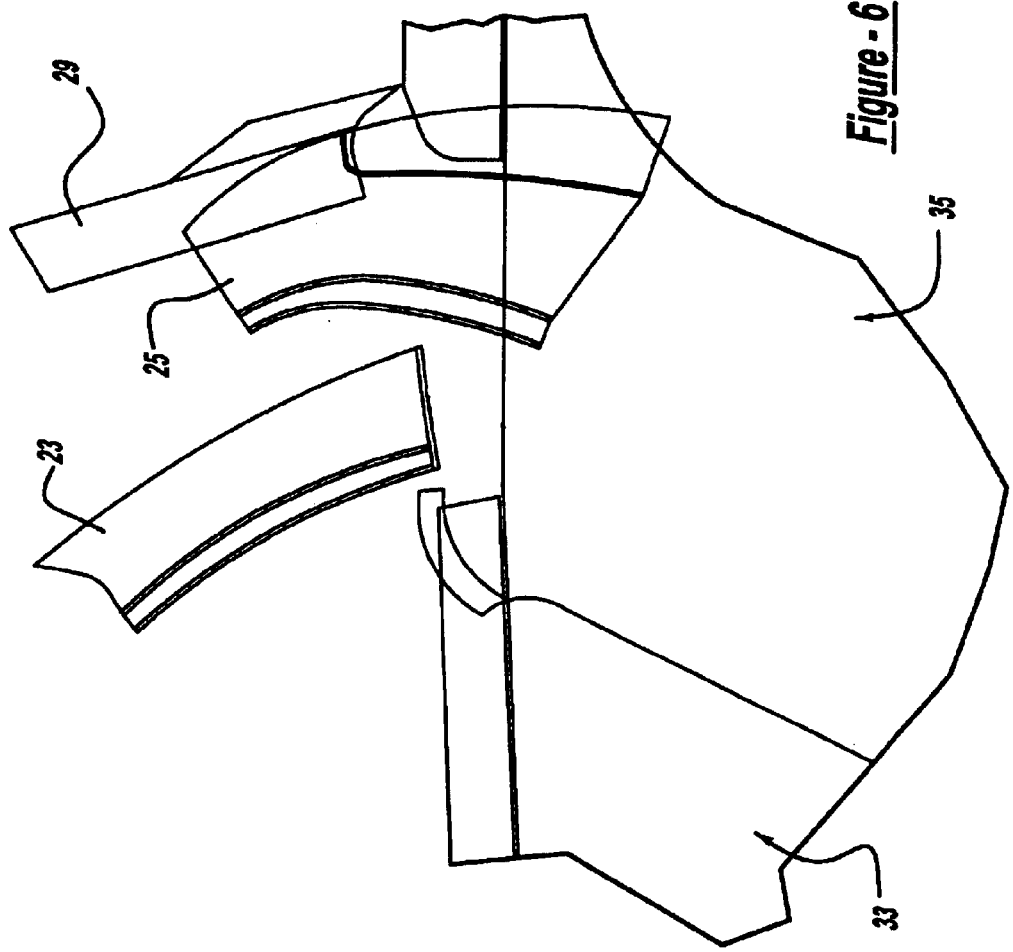
FIG. 6 is a side diagrammatic view showing the preferred embodiment apparatus, disposed in the partially retracted position.
Figure 7:
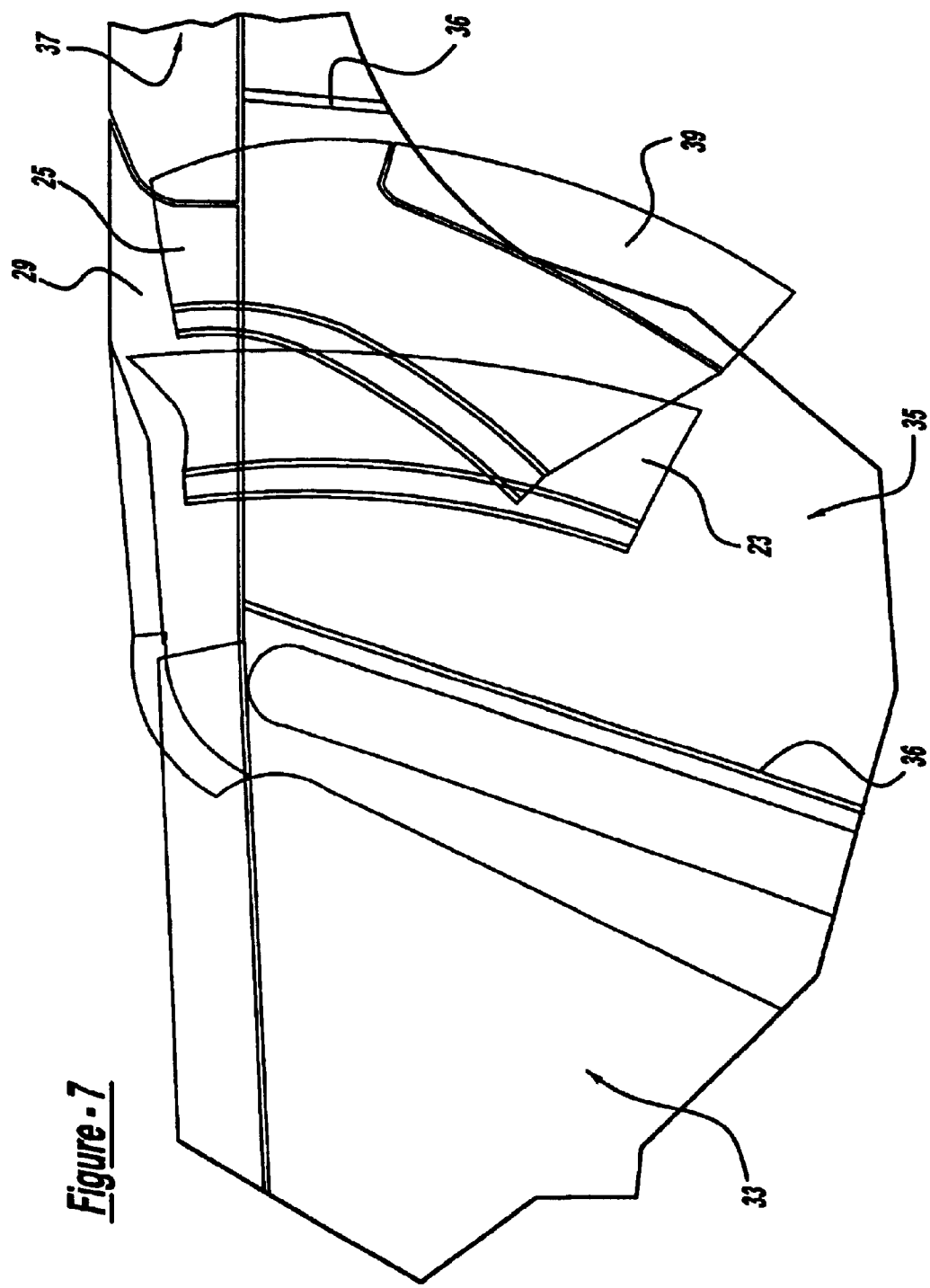
FIG. 7 is a side diagrammatic view showing the preferred embodiment apparatus, disposed in the fully retracted position.

Referring now to FIGS. 1–7, a convertible roof system 21 is part of an automotive vehicle and includes a hard-top front roof panel 23, a hard-top rear roof panel 25, a top stack mechanism 27 operable to move the roofs, a rigid tonneau cover 29 and a tonneau cover mechanism 31. Roofs 23 and 25 are automatically movable from fully raised and closed positions covering a passenger compartment 33, as shown in FIGS. 1 and 5, to fully retracted and open positions, as shown in FIGS. 3, 4 and 7, wherein roofs 23 and 25 are stowed in a roof storage area or compartment 35. Roof storage compartment 35 is located between and physically separated by metal panels 36 (see FIG. 7) from passenger compartment 33 and an externally accessible storage area for miscellaneous articles such as a trunk or pickup truck bed 37. A rigid, glass back window or backlite 39 is secured to rear roof panel 25 while front roof panel 23 is disengagably attached to a front header panel 41 by latches. Roofs 23 and 25 are preferably stamped from steel sheets and include inner reinforcement panels, but the roofs may alternately be formed from polymeric composites or aluminum. Roofs 23 and 25 have opaque outside surfaces 43 that are typically painted. These outside surfaces 43 define three-dimensionally curved planes that are stored in a predominantly vertical and parallel nested orientation when fully retracted and stowed; this can be observed best in FIGS. 4 and 7.

Top stack mechanism 27 is in mirrored symmetry in both outboard sides of the vehicle. Top stack mechanism 27 includes a pair of linkage assemblies 51 and a pair of hydraulic actuators 55. Linkage assembly 51 is preferably constructed in accordance with German patent application serial number 101 39 354.7 entitled "Carbiolet-Fahrzeug" (Vehicle), which was filed on Aug. 17, 2001 and the disclosure of which is hereby incorporated by reference. Roofs 23 and 25 can be tightly and closely nested together when fully retracted and the centerline, fore-and-aft roof storage area opening can be minimized due to linkage assemblies 51.

Figure 8:
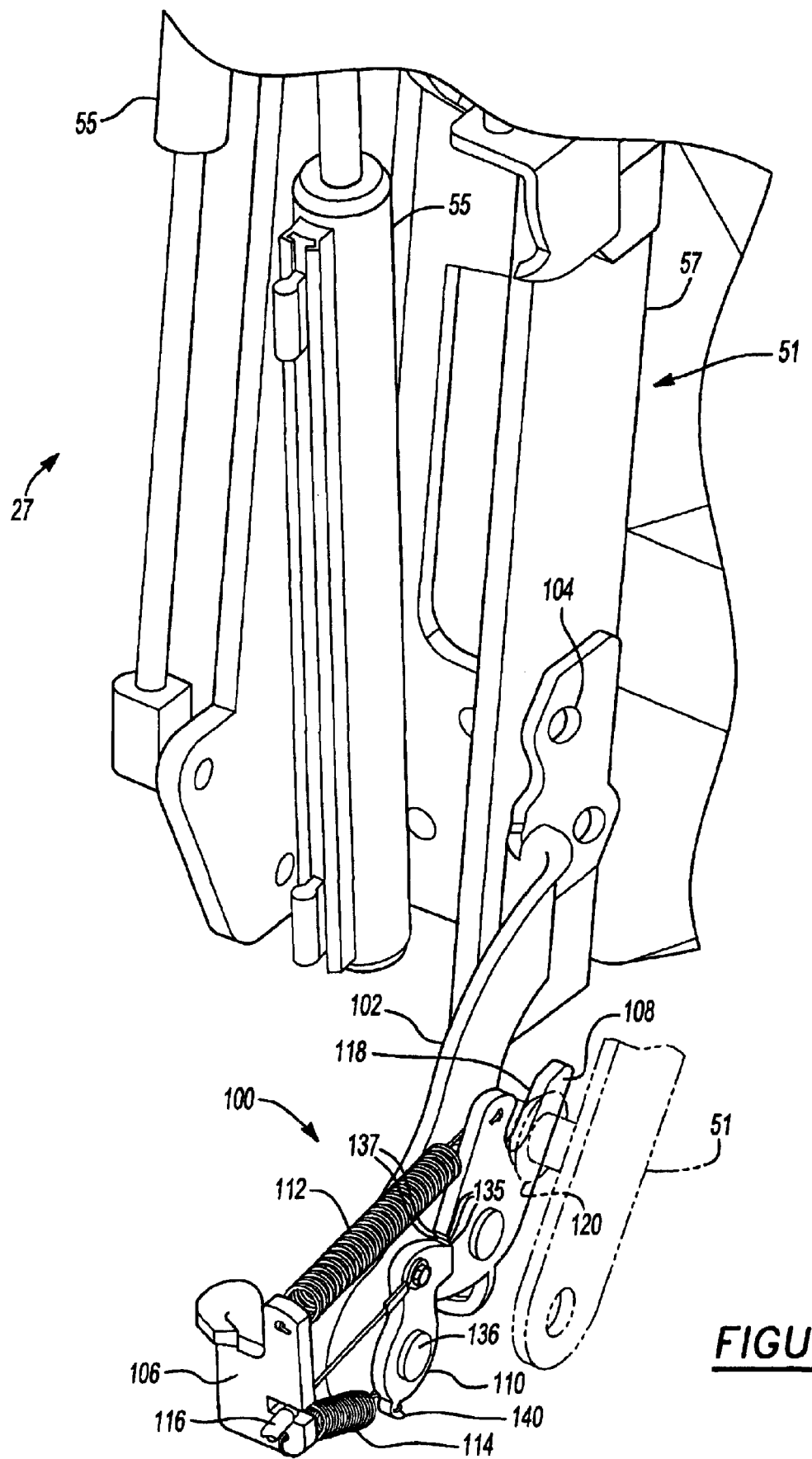
FIG. 8 is a fragmentary and perspective view showing the preferred embodiment apparatus in a locked position.
Figure 9:
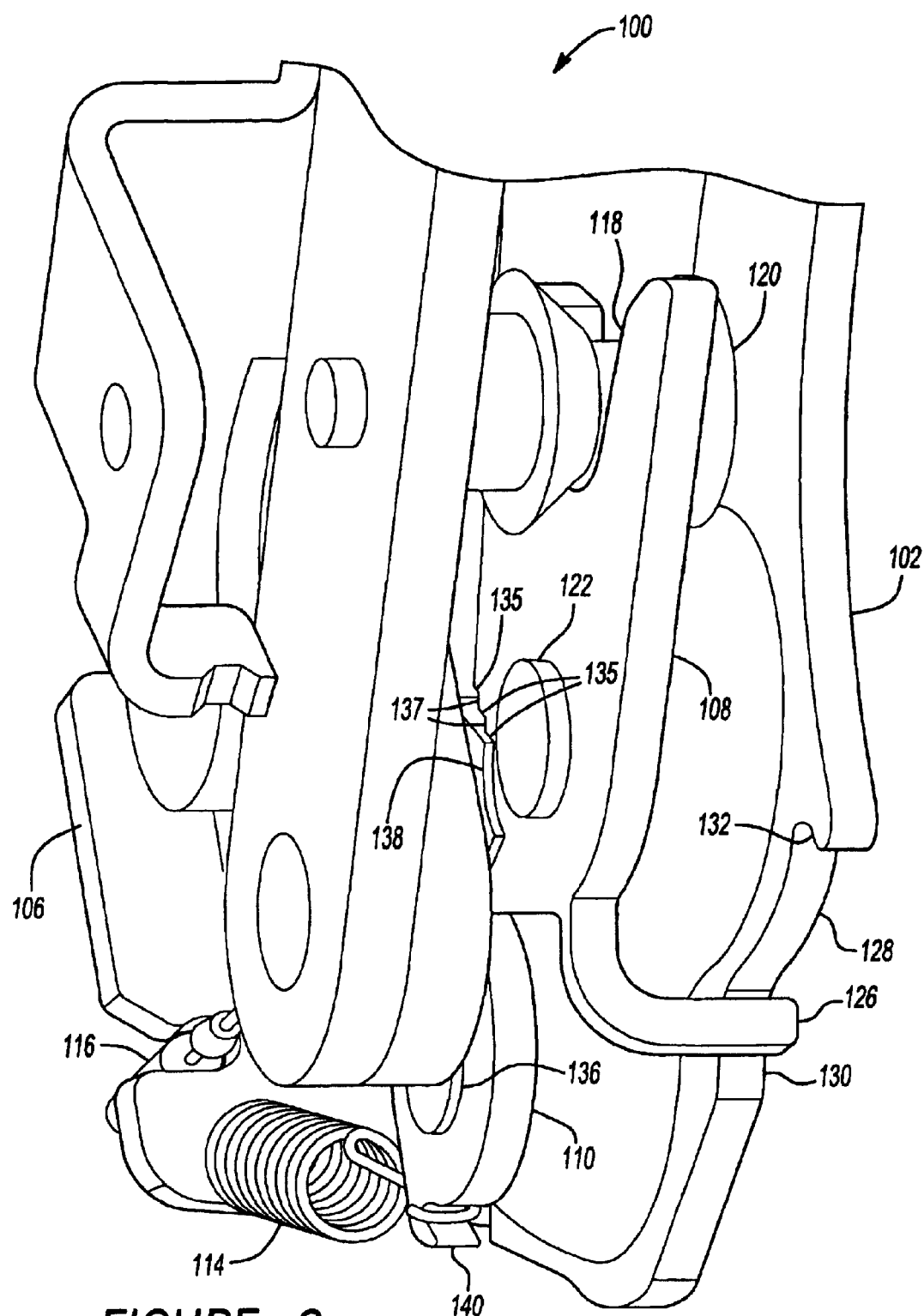
FIG. 9 is an enlarged fragmentary and perspective view showing the preferred embodiment apparatus, on an opposing side of the vehicle, in a locked position.

Convertible roof system 21 further includes a panel latch mechanism 100 adapted for retaining at least one of front roof panel 23 and rear roof panel 25. As can be seen from FIGS. 8–12, panel latch mechanism 100 is preferably coupled to at least a portion of top stack mechanism 27. With particular reference to FIG. 8, linkage assembly 51 and the pair of hydraulic actuators 55 are pivotally coupled to a top stack support member 57. Top stack support member 57 extends generally vertically along metal panel 36 or any other automotive support structure. A latch support bracket 102 is fixedly coupled to support member 57 and extends therefrom within roof storage compartment 35. Latch support bracket 102 may be coupled to support member 57 at point 104 in accordance with any one of a number of known methods, such as via fasteners, welding, stamping, and the like. Latch support bracket 102 is generally arcuate shaped and includes a perpendicularly turned end portion 106.

Panel latch mechanism 100 generally includes a striker 108, a locking pawl 110, a first extension spring 112, a second extension spring 114, and a cable actuator 116. Panel latch mechanism 100 is configured to selectively receive, retain, and lock top stack mechanism 27 and, thus, front roof panel 23 and rear roof panel 25 in a retracted and stowed position. To this end, striker 108 includes a cam slot 118 formed therein to receive a stud or latch member 120 extending from linkage assembly 51. Stud 120 is generally V-shaped in cross-section. However, it should be understood that stud 120 may have any shape conducive to operation.

Striker 108 is pivotally coupled to latch support bracket 102 at pivot 122. Striker 108 is thus able to pivot generally in a fore and aft direction relative to the vehicle. Striker 108 further includes a feature 124 capable of receiving a first end of first extension spring 112 therein. The opposing end of first extension spring 112 is coupled to perpendicularly turned end portion 106 so as to bias striker 108 in a forward or unlocked position (see FIG. 10). Striker 108 further includes a physical stop member 126 generally perpendicularly from striker 108. Physical stop member 126 is received within a cutout 128 formed in latch support bracket 102. Cutout 128 defines a first end 130 and a second end 132 that may engage physical stop member 126 of striker 108 when striker 108 is in locked position and unlocked position, respectively.

Striker 108 further includes a locking recess 134 formed therein for engaging with locking pawl 110. To this end, locking pawl 110 is pivotally coupled to latch support bracket 102 at pivot 136. Locking pawl 110 is thus able to pivot generally in a fore and aft direction relative to the vehicle. Locking pawl 110 includes a locking head 138 that is insertable within locking recess 134 of striker 108 to prevent rotation of striker 108. Thus, locking pawl 110 functions to lock striker 108 in the locked position.

Locking recess 134 may include optional step features 135 formed therein. Step features 135 preferably are arranged in a descend step arrangement having an opposing surface 137 at each level. Accordingly, locking head 138 of locking pawl 110 is engageable with each of the opposing surfaces 137 to prevent inadvertent unlocking and/or rotation of striker 108. It should be noted that step features 135 are particularly useful to facilitate a locking engagement between locking pawl 110 and striker 108 and is less sensitive to tolerance variations. Therefore, a locking engagement may still be achieved even if top stack mechanism 27 is not completely retracted due to temporary misalignment of parts, temperature variation, or other condition. However, the descending arrangement of step features 135 permits the panel latch mechanism 100 to increase its locking engagement should top stack mechanism 27 settle during travel. It should be noted, however, that step features 135 may have any shape that is conducive to a progressive locking feature.

Locking pawl 110 further includes a feature 140 capable of receiving a first end of second extension spring 114 therein. The opposing end of second extension spring 114 is coupled to perpendicularly turned end portion 106 so as to bias locking pawl in a rearward or locked position (see FIGS. 8 and 12). Locking pawl 110 still further is coupled to cable actuator 116 at point 142. Cable actuator 116 is coupled at one end to tonneau cover 29 such that as tonneau cover 29 is moved into a raised position, cable actuator 116 exerts a pulling force on locking pawl 110, thereby rotating locking pawl 110 into an unlocked position. Locking pawl 110 is finally released when tonneau cover 29 is retracted into its closed position.

Figure 10:
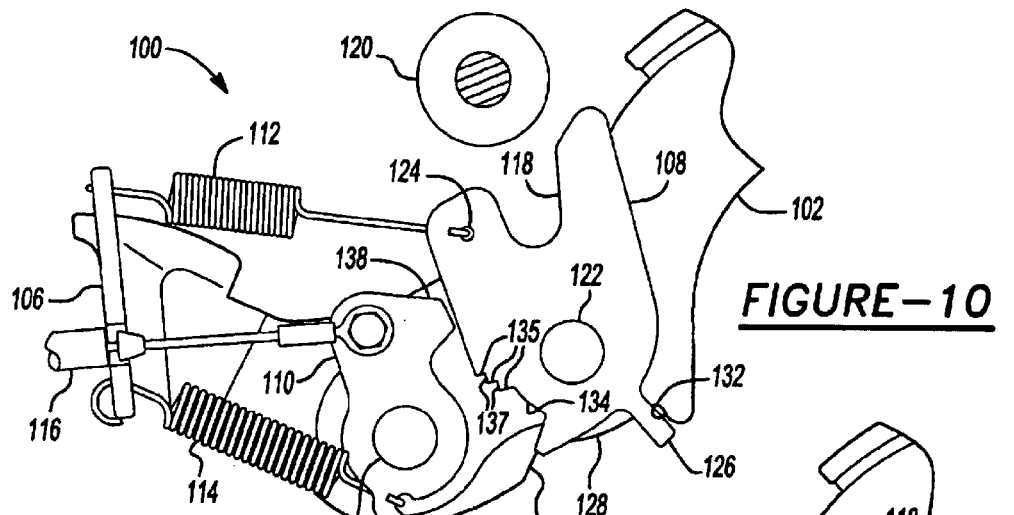
FIG. 10 is a side diagrammatic view showing the preferred embodiment apparatus, disposed in the fully unlocked position.
Figure 11:
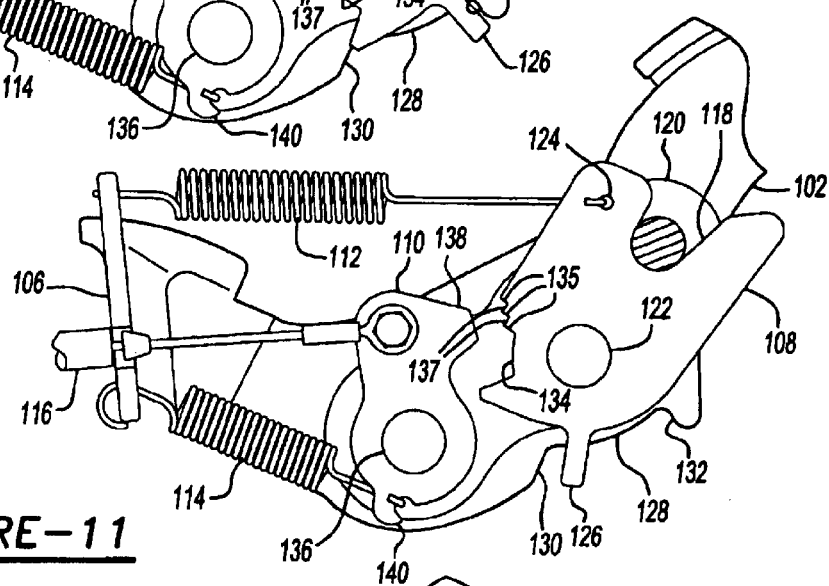
FIG. 11 is a side diagrammatic view showing the preferred embodiment apparatus, disposed in the intermediate position.
Figure 12:
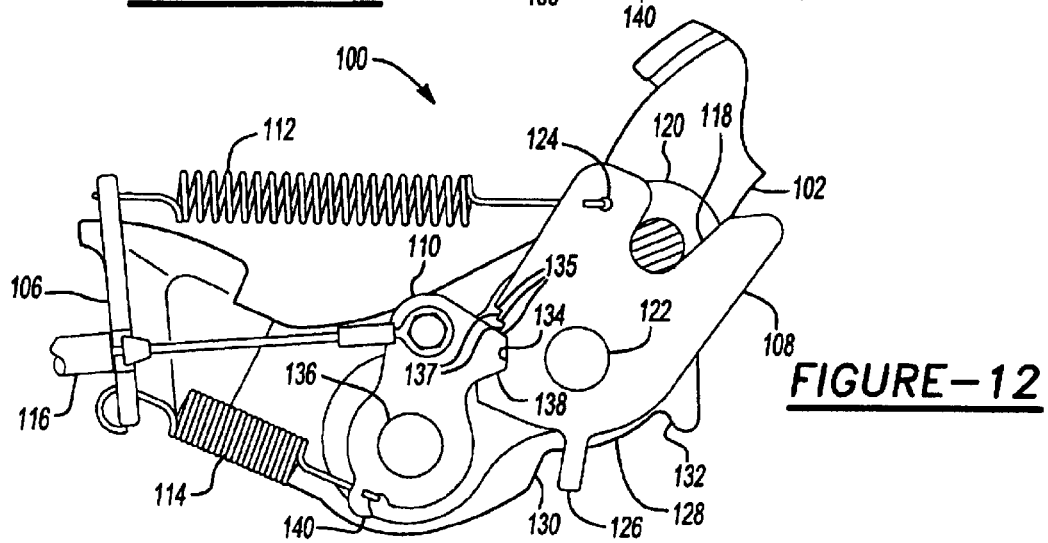
FIG. 12 is a side diagrammatic view showing the preferred embodiment apparatus, disposed in the locked position.

During operating, as seen in FIGS. 10–12, panel latch mechanism 100 is operated in response to actuation of tonneau cover 29 and top stack mechanism 27. Specifically, as seen in FIG. 10, panel latch mechanism 100 is shown in an unlocked position, wherein tonneau cover 29 is further opened. In this position, stud 120 is separate from striker 108. However, it should be understood that the specific distance between striker 108 and stud 120 is dependent upon the particular geometry of top stack mechanism 27. Therefore, variations from what is depicted in these figures is expected.

Still referring to FIG. 10, tonneau cover 29 is raised to some extent, thereby retracting cable actuator 116. Cable actuator 116 thus has pulled locking pawl 110 in a counter-clockwise direction (as seen in FIGS. 10–12) and prevents locking head 138 from engaging locking recess 134. As top stack mechanism 27 is actuated to retract front roof panel 23 and rear roof panel 25, stud 120 of linkage assembly 51 sweeps through a generally arcuate path and into engagement with at least one side of cam slot 118. Continued actuation of top stack mechanism 27 causes stud 120 to further ride along cam slot 118 and rotate striker 108 until roof system 21 is in its fully retracted position and striker is in its fully rotated position (as generally seen in FIG. 11). It should be noted that this rotation of striker 108 is against the biasing force of first extension spring 112.

Striker 108 remains unlocked until tonneau cover 29 is retracted into a closed position and locking pawl 110 is allowed to engage striker 108. To this end, as tonneau cover 29 is retracted, the pulling force exerted on locking pawl 110 by cable actuator 116 is relieved, thereby enabling the biasing force of second extension spring 114 to rotate locking pawl 110 in a clockwise direction (as seen in FIG. 12) until locking head 138 engages at least one step feature 135 of locking recess 134. Thus, top stack mechanism 27, front roof panel 23, and rear roof panel 25 are retained in a retracted position so as to minimize vibration, noise, and harshness.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A convertible roof latch for a vehicle, said vehicle having a tonneau cover positionable in a closed position and an opened position, said convertible roof latch comprising:

a top stack mechanism being positionable in an extended position and a retracted position; and a locking mechanism operable to selectively retain said top stack mechanism in said retracted position to generally prevent movement of said top stack mechanism, said locking mechanism being positionable in an unlocked position where said top stack mechanism is free to move relative to said locking mechanism and a locked position where said top stack mechanism is coupled with said locking mechanism in response to movement of the tonneau cover into the closed position to prevent relative movement of said top stack mechanism and said locking mechanism.

2. A convertible roof latch for a vehicle, said vehicle having a tonneau cover positionable in a closed position and an opened position, said convertible roof latch comprising:

a top stack mechanism being positionable in an extended position and a retracted position; and a locking mechanism operable to selectively retain said too stack mechanism in said retracted position to generally prevent movement of said top stack mechanism, said locking mechanism being positionable in an unlocked position where said top stack mechanism is free to move relative to said locking mechanism and a locked position where said too stack mechanism is coupled with said locking mechanism when the tonneau cover is in the closed position to prevent relative movement of said top stack mechanism and said locking mechanism, said locking mechanism comprises:

a latch member extending from said top stack mechanism;

a support bracket mountable to the vehicle;

a striker pivotally coupled to said support bracket, said striker having a slot for receiving said latch member of said top stack mechanism in said locked position; and a locking pawl pivotally coupled to said support bracket, said locking pawl being releasably engagable with said striker when said top stack mechanism is in said retracted position and said tonneau cover is in said closed position.

3. The convertible roof latch according to claim 2 wherein said locking pawl is biased into engagement with said striker.

4. The convertible roof latch according to claim 2, further comprising:

an actuator cable operably coupled to said locking pawl, said actuator cable urging said locking pawl into a disengaged position from said striker when said tonneau cover is in said opened position.

5. The convertible roof latch according to claim 2 wherein said striker is biased into said unlocked position.

6. The convertible roof latch according to claim 2, further comprising:

a recess formed in one of said striker and said support bracket; and a physical stop member extending from the other of said striker and said support bracket, said physical stop member being operable to engage said recess to prevent over rotation of said striker.

7. The convertible roof latch according to claim 2 wherein said slot comprises:

a plurality of progressive locking features operable to receive said locking pawl at intermediate positions of said top stack mechanism.

8. A convertible vehicle comprising:

a roof covering;

a tonneau cover positionable in a closed position and an opened position;

a top stack mechanism supporting said roof covering said top stack mechanism having a stud extending therefrom, said top stack mechanism being positionable in an extended position and a retracted position; and a locking mechanism operable to selectively retain said stud when said top stack mechanism is in said retracted position to generally prevent movement of said top stack mechanism, said locking mechanism being positionable in at least an unlocked position where said stud and said top stack mechanism are free to move relative to said locking mechanism and a locked position where said stud and said top stack mechanism are coupled with said locking mechanism as a result of movement of the tonneau cover into the closed position to prevent relative movement of said top stack mechanism and said locking mechanism.

9. A convertible vehicle comprising:

a roof covering;

a tonneau cover positionable in a closed position and an opened position;

a top stack mechanism supporting said roof covering, said too stack mechanism having a stud extending therefrom, said top stack mechanism being positionable in an extended position and a retracted position; and a looking mechanism operable to selectively retain said stud when said top stack mechanism is in said retracted position to generally prevent movement of said too stack mechanism, said locking mechanism being positionable in at least an unlocked position where said stud and said top stack mechanism are free to move relative to said locking mechanism and a locked position where said stud and said too stack mechanism are coupled with said locking mechanism when the tonneau cover is in the closed position to prevent relative movement of said top stack mechanism and said locking mechanism, said locking mechanism comprises:

a support bracket mountable to the convertible vehicle;

a striker pivotally coupled to said support bracket, said striker having a slot for receiving said stud of said top stack mechanism in said locked position; and a locking pawl pivotally coupled to said support bracket, said locking pawl being releasably engagable with said striker when said top stack mechanism is in said retracted position and said tonneau cover is in said closed position.

10. The convertible vehicle according to claim 9 wherein said locking pawl is biased into engagement with said striker.

11. The convertible vehicle according to claim 9, further comprising:

an actuator cable operably coupled to said locking pawl, said actuator cable urging said locking pawl into a disengaged position from said striker when said tonneau cover is in said opened position.

12. The convertible vehicle according to claim 9 wherein said striker is biased into said unlocked position.

13. The convertible vehicle according to claim 9, further comprising:

a recess formed in one of said striker and said support bracket; and a physical stop member extending from the other of said striker and said support bracket, said physical stop member being operable to engage said recess to prevent over rotation of said striker.

14. The convertible vehicle according to claim 9 wherein said slot comprises:
   a plurality of progressive locking features operable to receive said locking pawl at intermediate positions of said top stack mechanism.

15. A convertible roof latch for a vehicle, said vehicle having a tonneau cover positionable in a closed position and an opened position, said convertible roof latch comprising:
   a top stack mechanism having a latch member, said top stack mechanism being positionable in an extended position and a retracted position;
   a support bracket mountable to the vehicle;
   a striker pivotally coupled to said support bracket, said striker having a receptacle for receiving said latch member of said top stack mechanism; and
   a locking pawl pivotally coupled to said support bracket, said locking pawl being releasably engagable with said striker when said top stack mechanism is in said retracted position and said tonneau cover is in said closed position to prevent movement of said top stack mechanism.

16. The convertible roof latch according to claim 15 wherein said locking pawl is biased into engagement with said striker.

17. The convertible roof latch according to claim 15, further comprising:
   an actuator cable operably coupled to said locking pawl, said actuator cable urging said locking pawl into a disengaged position from said striker when said tonneau cover is in said opened position.

18. The convertible roof latch according to claim 15 wherein said striker is biased into said unlocked position.

19. The convertible roof latch according to claim 15, further comprising:
   a recess formed in one of said striker and said support bracket; and
   a physical stop member extending from the other of said striker and said support bracket, said physical stop member being operable to engage said recess to prevent over rotation of said striker.

20. A method of releasably retaining a convertible roof system of a vehicle, said convertible roof system having a roof structure, a top stack mechanism supporting said roof structure and having a retaining feature, a pivotable striker member engagable with said retaining feature, a locking pawl engageable with said pivotable striker member, and a tonneau cover, said method comprising:
   retracting said top stack mechanism;
   engaging said pivotable striker member with said retaining feature and driving said pivotable striker member into a locked position; and
   moving said tonneau cover from an opened position to a closed position, said movement of said tonneau cover from said opened position to said closed position causing said locking pawl to engage said pivotable striker member thereby generally deterring movement of said top stack mechanism.

21. The method according to claim 20, further comprising:
   moving said tonneau cover from said closed position to said opened position, said movement of said tonneau cover from said closed position to said opened position causing said locking pawl to disengage from said pivotable striker member; and
   extending said top stack mechanism.

22. The method according to claim 20, further comprising:
   biasing said locking pawl in said engagement with said pivotable striker member.

23. The method according to claim 20, further comprising:
   biasing said pivotable striker member into an unlocked position.

24. The method according to claim 20, further comprising:
   preventing over rotation of said pivotable striker member.

25. A method of releasably retaining a convertible roof system of a vehicle, said convertible roof system having a roof structure, a top stack mechanism supporting said roof structure, a pivotable striker member engagable with said top stack mechanism, a locking pawl engagable with said pivotable striker member, and a tonneau cover, said method comprising:
   retracting said top stack mechanism;
   engaging said pivotable striker member with said top stack mechanism and driving said pivotable striker member into a locked position; and
   positioning a tonneau cover into a closed position causing said locking pawl to engage said pivotable striker member to prevent movement of said top stack mechanism.

26. The method according to claim 25, further comprising:
   positioning said tonneau cover into an opened position causing said locking pawl to disengage from said pivotable striker member; and
   extending said top stack mechanism.

27. The method according to claim 25, further comprising:
   biasing said locking pawl in said engagement with said pivotable striker member.

28. The method according to claim 25, further comprising:
   biasing said pivotable striker member into an unlocked position.

29. The method according to claim 25, further comprising:
   preventing over rotation of said pivotable striker member.

30. The method according to claim 25 wherein said positioning said tonneau cover into said closed position causing said locking pawl to engage said pivotable striker member to prevent movement of said top stack mechanism includes engaging said locking pawl with at least one of a plurality of locking features formed in said pivotable striker.

* * * * *

UNITED STATES PATENT AND TRADEMARK OFFICE
CERTIFICATE OF CORRECTION

PATENT NO. : 6,767,047 B2
DATED : July 27, 2004
INVENTOR(S) : Stefan Eichlorst, Gary J. Forgue and David W. Brooks It is certified that error appears in the above-identified patent and that said Letters Patent is hereby corrected as shown below:

Column 1,
Line 34, "Danzi" should be -- Danzl --.

Column 5,
Lines 27 and 32, "too" should be -- top --.

Column 6,
Line 29, 34 and 39, "too" should be -- top --.
Line 32, "looking" should be -- locking --.

Signed and Sealed this

Fourteenth Day of December, 2004

JON W. DUDAS
*Director of the United States Patent and Trademark Office*

UNITED STATES PATENT AND TRADEMARK OFFICE
CERTIFICATE OF CORRECTION

PATENT NO. : 6,767,047 B2
APPLICATION NO. : 10/629410
DATED : July 27, 2004
INVENTOR(S) : Stefan Eichhorst, Gary J. Forgue and David W. Brooks It is certified that error appears in the above-identified patent and that said Letters Patent is hereby corrected as shown below:

Column 1,
Line 34, "Danzi" should be -- Danzl --.

Column 5,
Lines 27 and 32, "too" should be -- top --.

Column 6,
Line 29, 34 and 39, "too" should be -- top --.
Line 32, "looking" should be -- locking --.

This certificate supersedes the Certificate of Correction issued December 14, 2004.

Signed and Sealed this

Twenty-ninth Day of January, 2008

JON W. DUDAS
*Director of the United States Patent and Trademark Office*